United States Patent [19]

Tsumura

[11] Patent Number: 5,388,404
[45] Date of Patent: Feb. 14, 1995

[54] CONTROLLER DEVICE FOR ELECTRICALLY HEATED CATALYST OF AUTOMOTIVE ENGINE

[75] Inventor: Tatsuya Tsumura, Himeji, Japan

[73] Assignee: Mitsubishi Denki Kabushiki Kaisha, Tokyo, Japan

[21] Appl. No.: 70,794

[22] Filed: Jun. 3, 1993

[30] Foreign Application Priority Data

Jun. 9, 1992 [JP] Japan .................................. 4-149416
Jul. 13, 1992 [JP] Japan .................................. 4-185345

[51] Int. Cl.⁶ .................................................. F01N 3/28
[52] U.S. Cl. ........................................ 60/284; 60/300; 219/202
[58] Field of Search ...................... 60/284, 300, 274; 219/202

[56] References Cited

U.S. PATENT DOCUMENTS

| 5,163,290 | 11/1992 | Kinnear | 60/284 |
| 5,224,335 | 7/1993 | Yoshizaki | 60/277 |
| 5,319,929 | 6/1994 | Cornelison | 60/284 |
| 5,321,231 | 6/1994 | Schmalzriedt | 60/300 |

FOREIGN PATENT DOCUMENTS

| 1308736 | 10/1962 | France | 60/284 |
| 331510 | 2/1991 | Japan . | |

*Primary Examiner*—Douglas Hart
*Attorney, Agent, or Firm*—Sughrue, Mion, Zinn, Macpeak & Seas

[57] ABSTRACT

A control device for controlling current supply to a resistance heater 2a for pre-heating an electrically heated catalyst 2 includes a controller 7 which begins to supply current to the resistance heater 2a when the ignition switch 8 is turned to the HEAT contact position, provided that the battery voltage is above an appropriate level. After the electrically heated catalyst 2 is thus pre-heated above a predetermined temperature, the controller 7 returns the ignition switch 8 either to the START contact to crank the engine or to the ON contact to wait for the driver to start the engine.

6 Claims, 7 Drawing Sheets

CONTROLLER DEVICE FOR ELECTRICALLY HEATED CATALYST OF AUTOMOTIVE ENGINE

BACKGROUND OF THE INVENTION

This invention relates to a control device for controlling the current supply to the heater for pre-heating the catalyst cleaner of an automotive engine, such that the catalyst is activated when the engine is still cold.

For the purpose of cleaning the exhaust gas of automobiles, catalyst converters including metals exhibiting high catalyst activity, such as platinum, palladium, and rhodium, are provided in the exhaust tube of the automotive engine. The exhaust gas is passed through the catalyst converter and the noxious components, such as hydrogen carbide (HC), carbon monoxide (CO), and nitrogen oxides (NOx), are converted into non-noxious compounds. Namely, the hydrogen carbide and the carbon monoxide are oxidized into water ($H_2O$) and carbon dioxide ($CO_2$), respectively. The nitrogen oxides are reduced to the nitrogen gas.

The catalyst converters for cleaning the exhaust gas exhibit best performance only when the catalyst is heated above a predetermined activation temperature. It is thus generally necessary that the catalyst is kept above 300 degrees Celsius for best performance. When the engine is below the activation temperature immediately after the start, the cleaning efficiency of the catalyst is low. During the time when the engine is operated at a low temperature, a great amount of noxious components such as HC, CO, and NOx are generated. It is thus urgently requested that the catalyst converter be heated to the activation temperature quickly.

Japanese Laid-Open Patent (Kokai) No. 3-31510, for example, proposes to provide the catalyst with a heater. The catalyst is then heated by the heater above the activation temperature to reduce the noxious components released into the air. Further, various proposals are made for determining the appropriate timing for starting the pre-heating of the catalyst. According to such proposals, the catalyst heater is turned on: (1) when the door key is inserted into the lock of the driver's door of the automobile to open it; (2) when the electrical system of the automobile is turned on before the engine is started; or (3) at the same as when the engine is started.

These methods of determining the timings of pre-heating the catalyst, however, have the following disadvantages. According to the first method (1), it is assumed that the engine will be started soon after the door key is inserted into the lock of the door at the driver's seat. However, the insertion of the door key does not necessary mean that the driver is going to start the engine. Thus, if the driver does not start the engine the catalyst heating must be turned off by means of a timer after a predetermined interval. Even then, repeated pre-heating operations are a heavy burden upon the battery. Furthermore, the door lock may be left open. In that instance, the door key is not used at all when the driver gets into the automobile. In the case of the second method (2) by which the pre-heating is started simultaneously when the electrical system is turned on, the battery is placed under a heavy burden if the electrical system includes other loads which are turned on simultaneously. On the other hand, if the catalyst heater is turned on according to the third method (3) when the engine is started, some length of time lapses before the catalyst is heated to the activation temperature. Thus the noxious components within the exhaust gas immediately after the start of the engine cannot be suppressed.

SUMMARY OF THE INVENTION

It is therefore an object of this invention to provide a control device for an automotive catalyst cleaner by which the pre-heating of the catalyst is commenced at an appropriate time before the engine is started, such that the catalyst is pre-heated to the activation temperature before the engine is started and the release of the noxious components of the exhaust gas into the air is effectively suppressed.

The above object is accomplished in accordance with the principle of this invention by a control device for controlling a current supply from a battery to an electrical heater for pre-heating a catalyst device for an automotive engine cranked by an electrical starter. The control device comprises:

heater current control switch means for turning on and off a current supply from the battery to the electrical heater;

catalyst temperature detector means for detecting a temperature of the catalyst device and generating an output signal indicating a detected temperature;

battery voltage detector means for detecting a voltage of the battery and generating an output signal indicating a detected voltage;

an ignition switch including at least an OFF contact, an ON contact, a START contact, and a HEAT contact, to any one of which a driver of an automobile may selectively turn a key switch, the ignition switch generating an output signal indicating a position of the key switch; and controller means coupled to the catalyst temperature detector means, the battery voltage detector means and the ignition switch, the controller means controlling the heater current control switch means in response to the output signals from the catalyst temperature detector means, the battery voltage detector means, and the ignition switch, wherein: (a) in response to the output signal from the ignition switch indicating that the key switch is turned to the HEAT contact, the controller means determines the battery voltage on the basis of the output of the battery voltage detector means and turns on the heater current control switch means to supply current from the battery to the electrical heater to commence a pre-heating of the catalyst device when the battery voltage exceeds a predetermined level; and (b) the controller means determines the catalyst temperature on the basis of the output of the catalyst temperature detector means, and returns the key switch to the START contact to supply current from the battery to the electrical starter and thereby to commence automatically a cranking of the automotive engine when the catalyst temperature exceeds a predetermined level.

Alternatively, the control device comprises:

heater current control switch means for turning on and off a current supply from the battery to the electrical heater;

catalyst temperature detector means for detecting a temperature of the catalyst device and generating an output signal indicating a detected temperature;

battery voltage detector means for detecting a voltage of the battery and generating an output signal indicating a detected voltage;

an ignition switch including at least an OFF contact, an ON contact, a START contact, and a HEAT contact, to any one of which a driver of an automobile may selectively turn a key switch, the ignition switch generating an output signal indicating a position of the key switch; and controller means coupled to the catalyst temperature detector means, the battery voltage detector means and the ignition switch, the controller means controlling the heater current control switch means in response to the output signals from the catalyst temperature detector means, the battery voltage detector means, and the ignition switch, wherein: (a) in response to the output signal from the ignition switch indicating that the key switch is turned to the HEAT contact, the controller means determines the battery voltage on the basis of the output of the battery voltage detector means and turns on the heater current control switch means to supply current from the battery to the electrical heater to commence a pre-heating of the catalyst device when the battery voltage exceeds a predetermined level; and (b) the controller means determines the catalyst temperature on the basis of the output of the catalyst temperature detector means, and returns the key switch to the ON contact when the catalyst temperature exceeds a predetermined level, wherein the controller means supplies current from the battery to the electrical starter to commence cranking of the automotive engine when the driver turns the key switch to the START contact.

Still alternatively, the control device comprises:

heater current control switch means for turning on and off a current supply from the battery to the electrical heater;

catalyst temperature detector means for detecting a temperature of the catalyst device and generating an output signal indicating a detected temperature;

battery voltage detector means for detecting a voltage of the battery and generating an output signal indicating a detected voltage;

an ignition switch including at least an OFF contact, an ON contact, and a START contact to any one of which a driver of an automobile may selectively turn a key switch, the ignition switch generating a first output signal indicating a pre-heating operation when the key switch is turned to the START contact a first time after the key switch is turned from the OFF contact to the ON contact, and the ignition switch generating a second output signal indicating a cranking of the automotive engine when the key switch is turned to the START contact a second time;

controller means coupled to the catalyst temperature detector means, the battery voltage detector means and the ignition switch, the controller means controlling the heater current control switch means in response to the output signals from the catalyst temperature detector means, the battery voltage detector means, and the ignition switch, wherein: (a) in response to the output signal from the ignition switch indicating that the key switch is turned to the START contact a first time, the controller means determines the battery voltage on the basis of the output of the battery voltage detector means and turns on the heater current control switch means to supply current from the battery to the electrical heater to commence a pre-heating of the catalyst device when the battery voltage exceeds a predetermined level; and (b) the controller means determines the catalyst temperature on the basis of the output of the catalyst temperature detector means, and returns the key switch to the ON contact when the catalyst temperature exceeds a predetermined level, wherein the controller supplies current from the battery to the electrical starter to commence cranking of the automotive engine when the driver turns the key switch from the ON contact to the START contact.

According to another aspect of this invention, a control device is provided which comprises:

an ignition switch including at least a START contact; and controller means, including timer means and coupled to the ignition switch, wherein:
(a) the controller means supplies a pulse-shaped current from the battery to the electrical heater for a predetermined interval of time determined by the timer means;
(b) after the predetermined interval of time, the controller supplies current from the battery to the starter to crank and start the automobile engine; and
(c) after the automobile engine is started, the controller supplies a continuous current substantially at a constant level from the battery to the electrical heater.

Preferably the controller interrupts current supply from the battery to the electrical heater after the predetermined interval of time.

Still preferably, the control device further comprises: catalyst temperature detector means for detecting a temperature of the catalyst device, the catalyst temperature detector means outputting a signal indicating a detected temperature to the controller; wherein the controller interrupts the supply of the continuous current to the electrical heater upon receiving a signal from the catalyst temperature detector indicating that a temperature of the catalyst device has exceeded a predetermined level.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
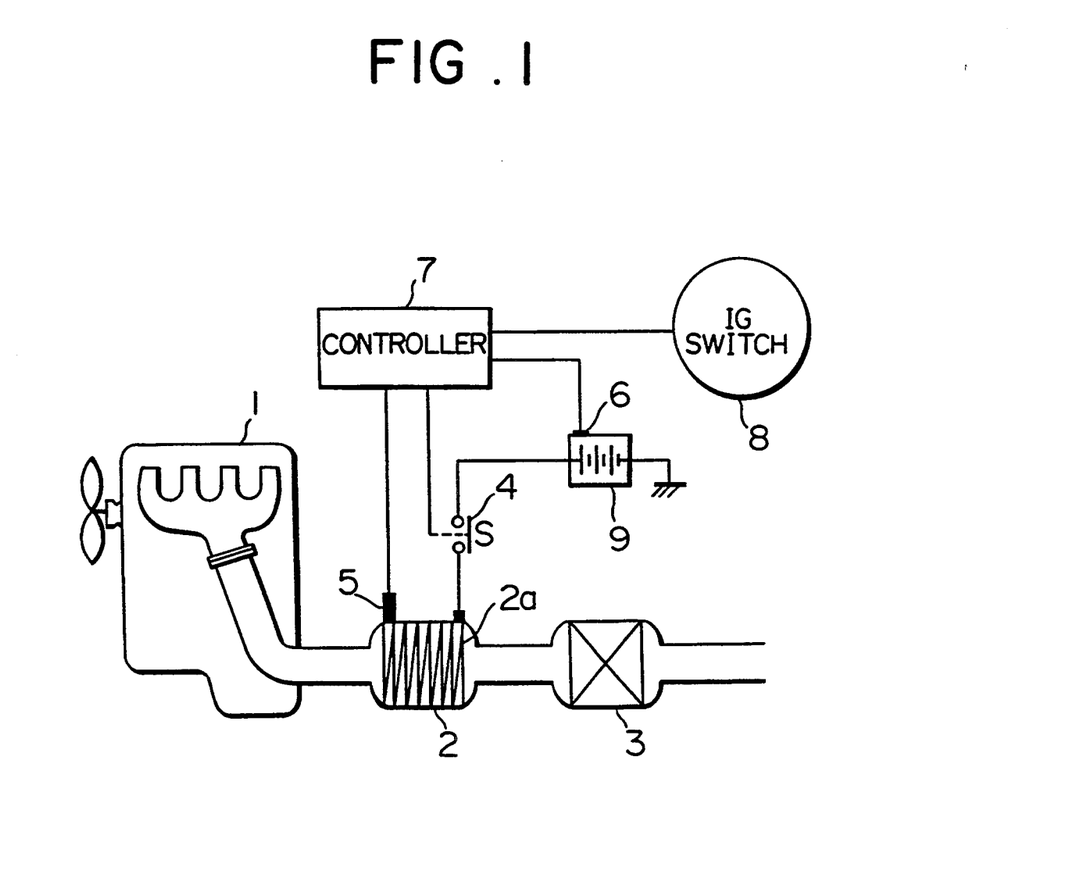
FIG. 1 is a diagram showing an automotive engine and the exhaust gas cleaning system including an electrically heated catalyst according to this invention.

FIG. 1 is a diagram showing an automotive engine and the exhaust gas cleaning system including an electrically heated catalyst according to this invention. The exhaust gas of an automotive engine 1 is first passed through an electrically heated catalyst 2, heated by a resistance heater 2a, and then through ternary catalyst 3 before being released into the air. The current supply from a battery 9 to the electrically heated catalyst 2 is controlled by a heater current control switch 4. A catalyst temperature detector 5 detects the temperature of the electrically heated catalyst 2. A battery voltage detector 6 detects the voltage of the battery 9 mounted on the automobile. In response to the signals from the catalyst temperature detector 5 and an ignition switch 8, a controller 7 controls the heater current control switch 4 to thereby activate the electrically heated catalyst 2 at an appropriate time before the automotive engine 1 is started.

Figure 2A:
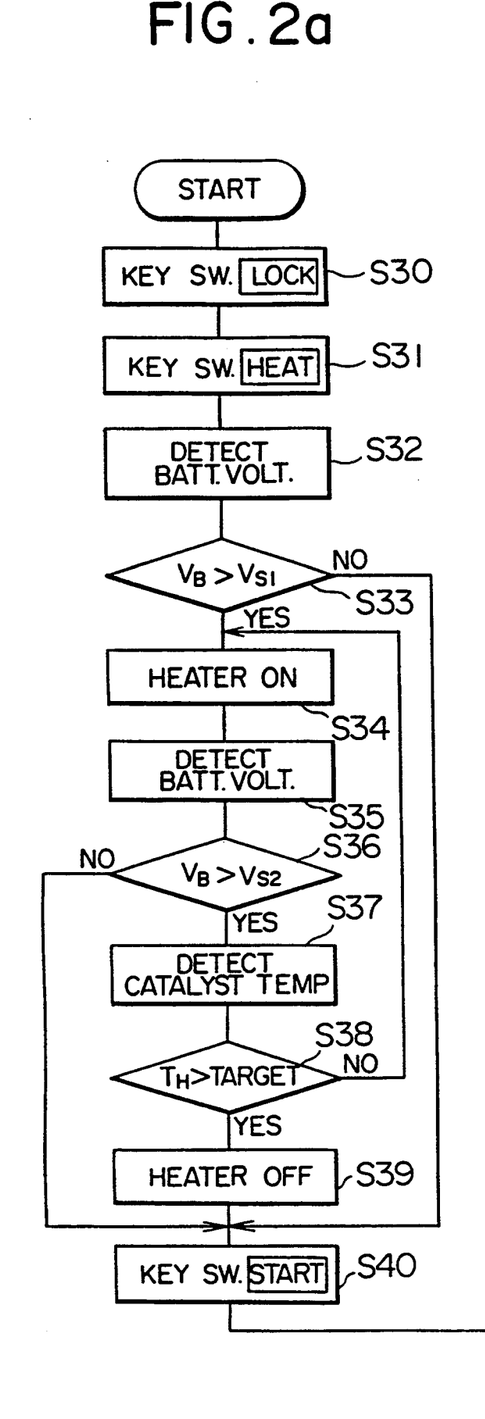
FIG. 2a is a flowchart showing the procedure by which the electrically heated catalyst is pre-heated according to the first embodiment of this invention.
Figure 2B:
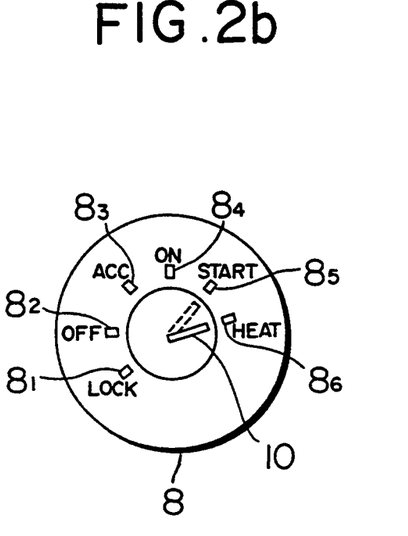
FIG. 2b is a front view of the ignition switch according to this invention as used in the first embodiment of this invention.

FIG. 2b is a front view of the ignition switch according to this invention as used in the first embodiment of this invention. As shown in FIG. 2b, the ignition switch 8 includes, in addition to the usual contact positions LOCK $8_1$, OFF $8_2$, ACC $8_3$, ON $8_4$, and START $8_5$, a HEAT contact position $8_6$. The key switch 10 is turned to the HEAT contact $8_6$ by the driver before the automotive engine 1 is started. The contact position information of the ignition switch 8 is input to the controller 7, as well as the detection signals from the catalyst temperature detector 5 and the battery voltage detector 6.

When the signal from the ignition switch 8 indicates that the key switch 10 is at the HEAT contact $8_6$, the controller 7 determines the start timing of the catalyst heating and, on the basis of the outputs from the catalyst temperature detector 5 and the battery voltage detector 6, controls the resistance heater 2a to heat the electrically heated catalyst 2 to an appropriate temperature. Thus, the electrically heated catalyst 2 is activated before the automotive engine 1 is started, and the exhaust gas from the automotive engine 1 is cleaned first by the electrically heated catalyst 2 and further by the ternary catalyst 3 before being released into the air.

FIG. 2a is a flowchart showing the procedure by which the electrically heated catalyst is pre-heated according to the first embodiment of this invention. When the automobile is to be started, the driver first inserts the key switch 10 into the ignition switch 8 and turns it from the position at LOCK contact $8_1$ to the position at the HEAT contact $8_6$ (steps S30 and S31). Then at step S32, the controller 7 determines the voltage of the battery 9 on the basis of the signal from the battery voltage detector 6, and, at step S33, judges whether or not the detected voltage $V_B$ is greater than a first predetermined reference voltage $V_{S1}$. If the judgment is negative at step S33 (i.e., if the detected voltage $V_B$ is not greater than the first predetermined reference voltage $V_{S1}$), the execution proceeds to step S40, where the key switch 10 is automatically turned to the position at the START contact $8_5$ as indicated by the dotted line in FIG. 2b. If, on the other hand, the judgment is affirmative at step S33, the execution proceeds to the next step S34, where the controller 7 turns on the heater current control switch 4 to supply current from the battery 9 to the resistance heater 2a, and starts to pre-heat the electrically heated catalyst 2. At step S35, the controller 7 again determines the voltage of the battery 9, and judges at step S36 whether or not the detected voltage $V_B$ is greater than a second predetermined reference voltage $V_{S2}$. If the judgment is negative at step S36 (i.e., if the detected voltage $V_B$ is not greater than the second predetermined reference voltage $V_{S2}$), the execution proceeds to step S40, where the key switch 10 is automatically turned to the position at the START contact $8_5$ as indicated by the dotted line in FIG. 2b.

If, on the other hand, the judgment is affirmative at step S36 (i.e., if the detected voltage $V_B$ is greater than the second predetermined reference voltage $V_{S2}$), the execution proceeds to step S37, where the controller 7 determines the temperature of the resistance heater 2a on the basis of the output signal from the catalyst temperature detector 5. At the next step S38, the controller 7 determines whether or not the detected temperature $T_H$ is greater than the target level. If not, the execution returns to step S34 to repeat the steps S34 through S38. When the temperature $T_H$ of the resistance heater 2a is above the target level, the execution proceeds to the next step S39, where the heater current control switch 4 is turned off to end the pre-heating of the resistance heater 2a, and at step S40 the key switch 10 is automatically turned to the position at the START contact $8_5$.

Thus, at step S41, the automotive engine 1 is cranked. When the automotive engine 1 is started, the key switch 10 is automatically turned to the position at the ON contact $8_4$.

In the procedure of FIG. 2a, the current supply to the engine starter may be suspended even after the key switch 10 is turned to the position at the START contact $8_5$, if the catalyst temperature $T_H$ is not greater than the target level or if the battery voltage $V_B$ is not greater than the first or the second reference voltage. Then, the abnormal state is notified to the driver by a pilot lamp, etc., upon the dash board of the automobile.

Figures 3A, 3B:
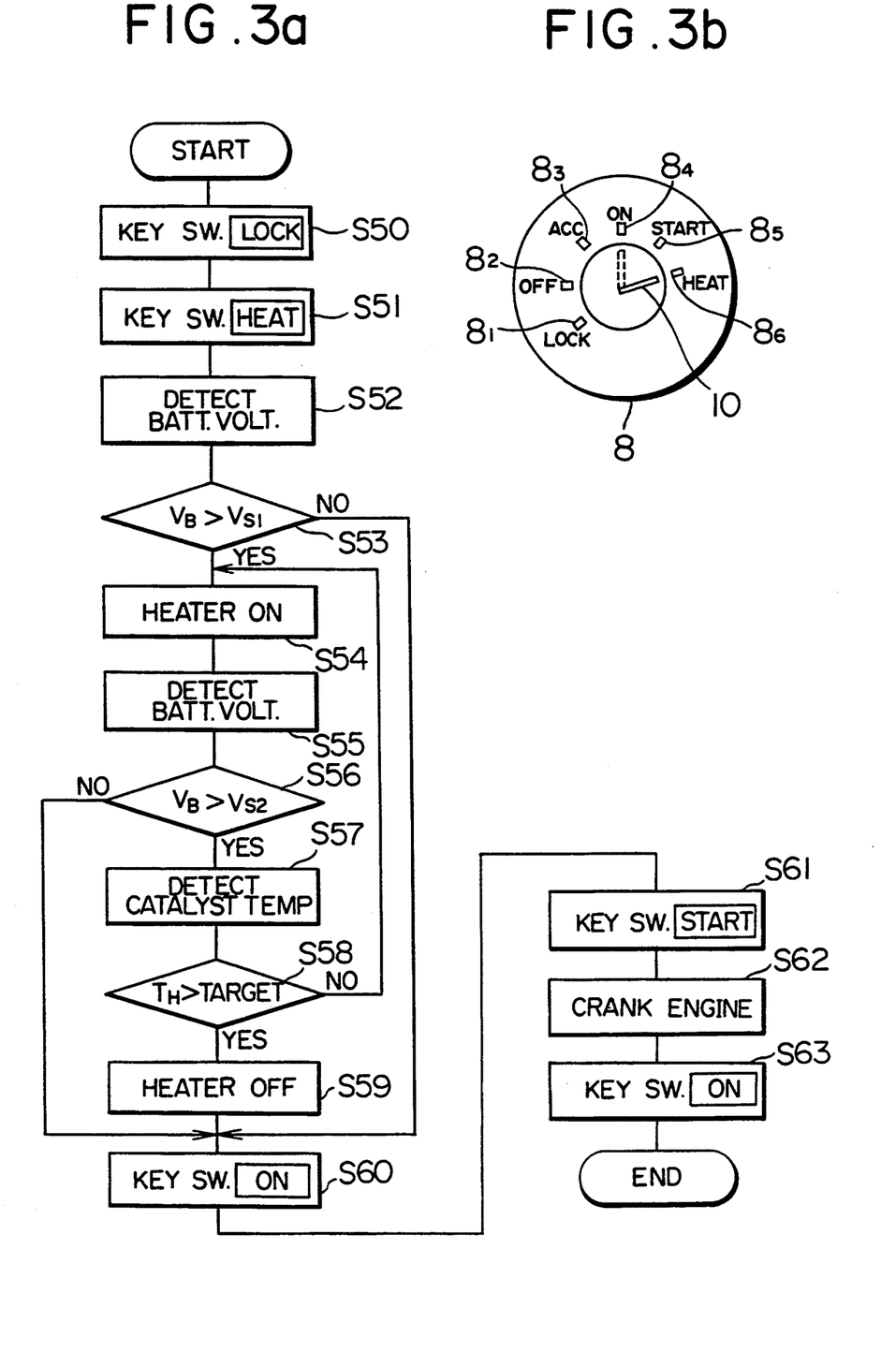
FIG. 3a is a flowchart showing the procedure by which the electrically heated catalyst is heated according to the second embodiment of this invention.
FIG. 3b is a front view of the ignition switch according to this invention as used in the second embodiment of this invention.

FIG. 3a is a flowchart showing the procedure by which the electrically heated catalyst is heated according to the second embodiment of this invention. FIG. 3b is a front view of the ignition switch according to this invention as used in the second embodiment of this invention. The steps S50 through S59 correspond to the steps S30 through S39 of FIG. 2a. However, after the step S59 or after the negative judgment at steps S53 and S56, the execution proceeds to step S60, where the key switch 10 is automatically turned to the position at the ON contact $8_4$ (indicated by dotted lines in FIG. 3b) to prepare for the cranking of the automotive engine 1. Then at step S61 the driver turns the key switch 10 to the position at the START contact 8₅ to crank the engine at step S62, and, after the engine is started, the key switch 10 is returned to the ON contact 8₄ at step S63.

Figure 4A:
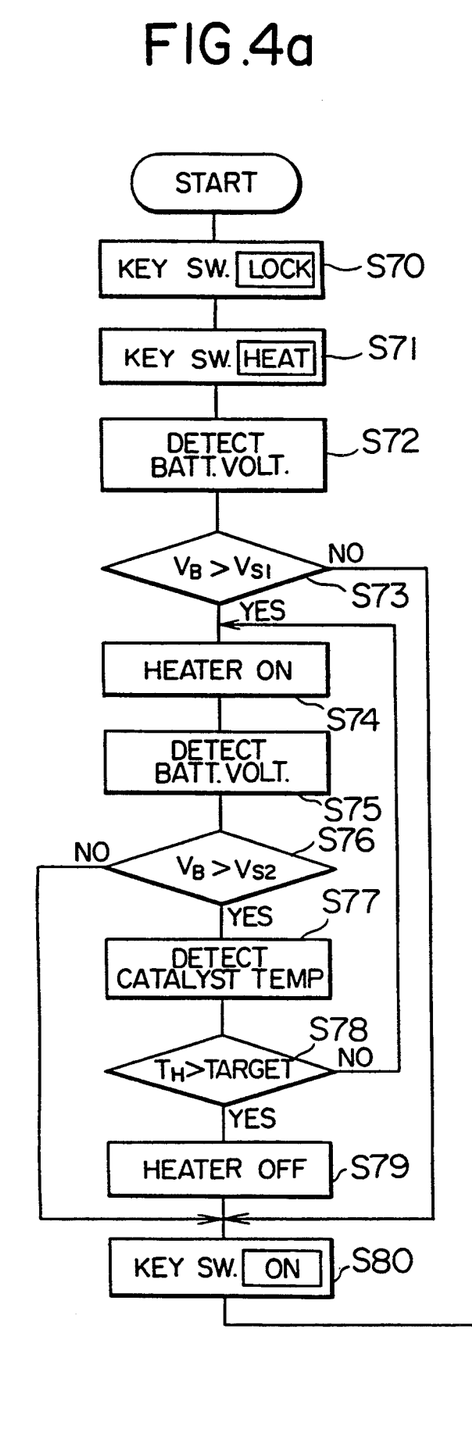
FIG. 4a is a flowchart showing the procedure by which the electrically heated catalyst is heated according to the third embodiment of this invention.
Figure 4B:
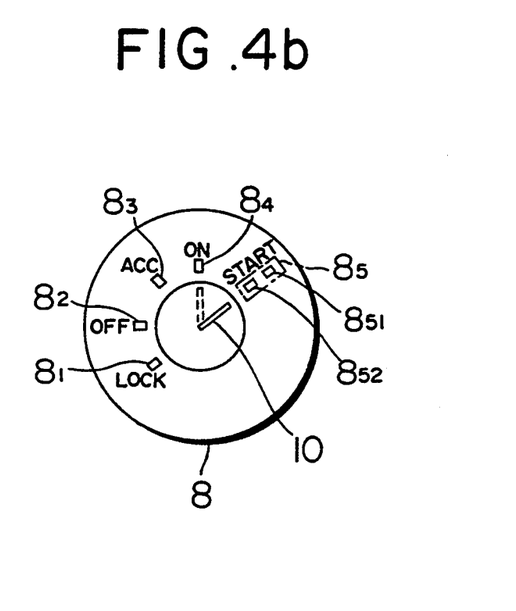
FIG. 4b is a front view of the ignition switch according to the third embodiment of this invention.

FIG. 4a is a flowchart showing the procedure by which the electrically heated catalyst is heated according to the third embodiment of this invention. FIG. 4b is a front view of the ignition switch according to the third embodiment of this invention. According to this embodiment, the START contact 8₅ position serves two distinct functions, indicated by the two pilot lamps START contact 8₅₁ and START contact 8₅₂, respectively. When the automotive engine 1 is to be started, the driver first turns the key switch 10 from the position at the LOCK contact 8₁ (step S70) to the position at the START contact 8₅ (step S71). Then, the START contact 8₅₁ is turned on and the ignition switch 8 outputs a corresponding signal to the controller 7. The signal output from the ignition switch 8 upon this occasion indicates that pre-heating of the electrically heated catalyst 2 is to be effected. The following steps S72 through S80 are similar to the corresponding steps S32 through S40 of FIG. 2a. After the automotive engine 1 is thus pre-heated and the key switch 10 is returned to the ON contact 8₄, the driver turns the key switch 10 again to the START contact 8₅ at step S81. This time, the START contact 8₅₂ is turned on and a corresponding signal is output from the ignition switch 8 to the controller 7. The signal output from the ignition switch 8 when the key switch 10 is returned to the START contact 8₅ indicates that the driver has again selected the START contact 8₅ and the engine is to be cranked. The engine is thus cranked at step S82, and after the engine is started, the key switch is returned to the ON contact 8₄ at step S83.

As in the case of the procedure of FIG. 2a, the current supply to the engine starter may be suspended even after the key switch 10 is returned to the position at the START contact 8₅, if the catalyst temperature $T_H$ is not greater than the target level, or if the battery voltage $V_B$ is not greater than the first or the second reference voltage. Then, the abnormal state is notified to the driver by a pilot lamp, etc.

An abrupt heating of the catalyst not only accelerates the deterioration of the catalyst and shortens the life thereof, but may cause fractures in the carrier of the catalyst. The current to the heater may, therefore, be supplied in the form of pulses. Then, the temperature rise is controlled by means of the duty factor of the pulse train.

Figure 5:
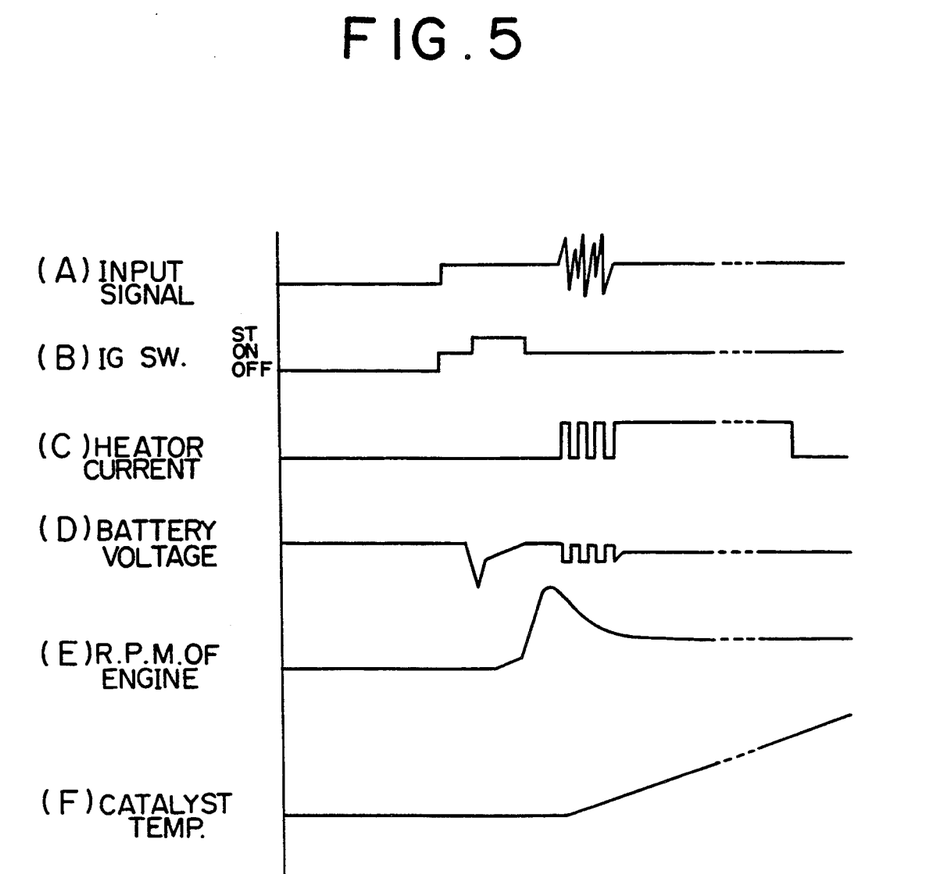
FIG. 5 is a timing chart showing various waveforms associated with an automotive engine.

FIG. 5 is a timing chart showing various waveforms associated with an automotive engine. In FIG. 5, the waveform (A) shows the input signal to various electrical devices; the waveform (B) shows the three contact states, ON, OFF, and START, of the ignition switch; the waveform (C) shows the current supply to the heater; the waveform (D) shows the voltage of the battery; the waveform (E) shows the rpm of the automotive engine; and the waveform (F) shows the temperature of the electrically heated catalyst. FIG. 5 shows the case where the current supply to the heater is started at the same time as when the engine is started.

As shown at (C) in FIG. 5, the pulse-shaped current is supplied to the electrically heated catalyst immediately after the start of the engine, and temperature rise of the catalyst is controlled by the duty factor of the pulses of the current. After the stable state is reached, the continuous current at a constant level is supplied to the heater.

When, however, a pulsed current at the level of several hundred amperes is supplied to the heater, the battery voltage undergoes a large fluctuation, as shown at (D) in FIG. 5. As a result, a large noise as shown by the sharp fluctuations in the waveform (A) is generated in the input signal to the various electrical devices. This reduces the reliability of these electrical devices whose operations are needed after the engine is started.

Thus, the following embodiment provides a controller for controlling the current supply to the heater for the catalyst by which not only the temperature rise is controlled adequately to suppress the deterioration of the catalyst, but also the generation of the noise in the waveform of the input signal to the various electrical devices of the automobile is suppressed, thereby improving the reliability of the various electrical devices of the automobile. Next, the embodiment is described by reference to FIGS. 6 and 7.

Figure 6:
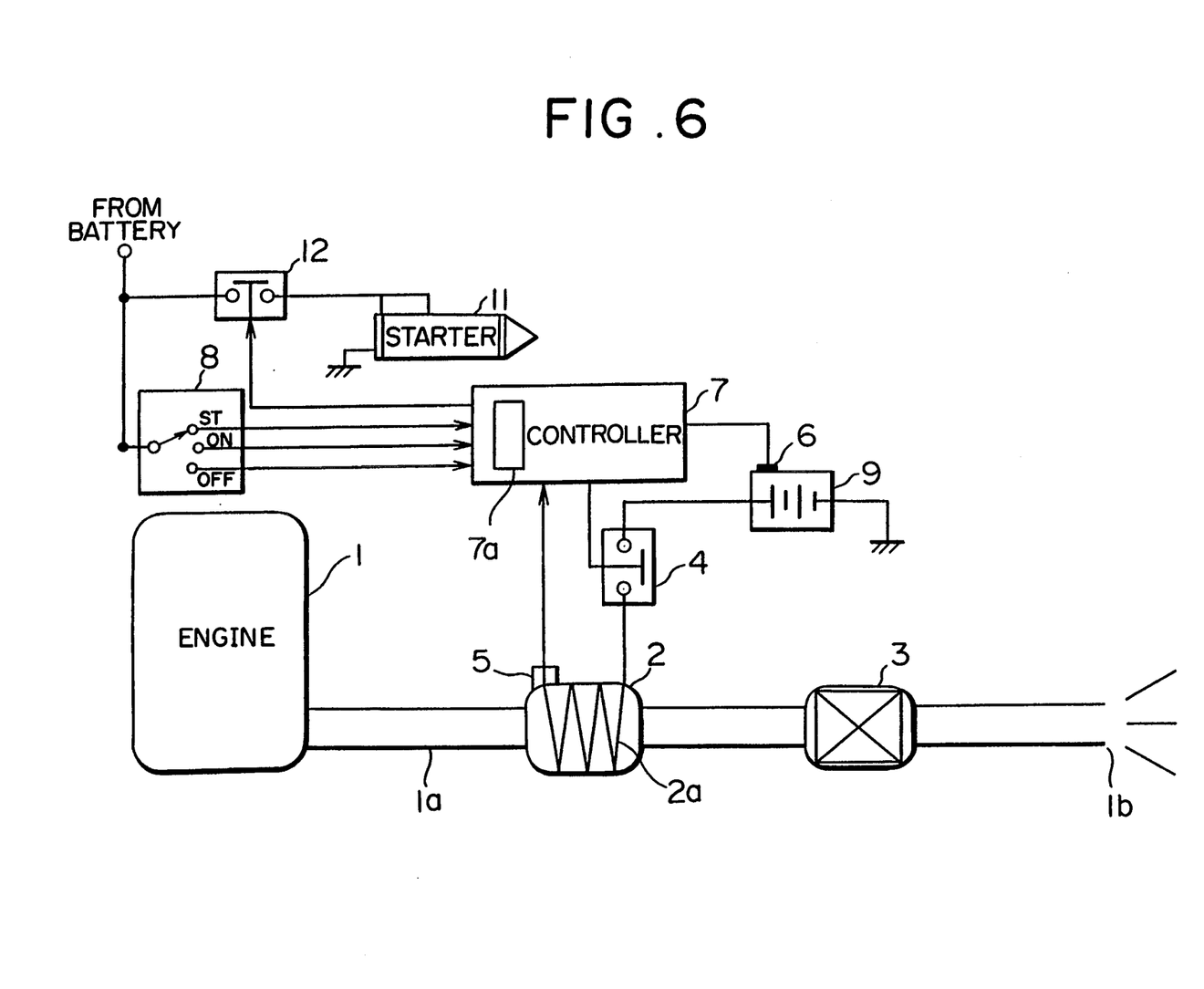
FIG. 6 is another diagram showing an automotive engine and the exhaust gas cleaning system including electrically heated catalyst according to this invention.

FIG. 6 is another diagram showing an automotive engine and the exhaust gas cleaning system including an electrically heated catalyst according to this invention. The exhaust gas of the automotive engine 1 is guided through the exhaust tube 1a, and, after being passed through and cleaned by an electrically heated catalyst 2 and a ternary catalyst 3, is released into the air from the outlet 1b. The electrically heated catalyst 2 is heated by a resistance heater 2a. The current supply from the battery 9 to the resistance heater 2a is turned on and off by means of a heater current control switch 4. The temperature of the electrically heated catalyst 2 is detected by a catalyst temperature detector 5, and the voltage of the battery 9 is detected by a battery voltage detector 6, The ignition switch 8 has three contact positions: START, ON and OFF. In response to the input signals from the catalyst temperature detector 5, the battery voltage detector 6, and the ignition switch 8, the controller 7, including a timer means 7a, turns on and off the heater current control switch 4, to control the current supply to the resistance heater 2a. The current supply from the battery 9 to the engine starter 11 for starting the automotive engine 1 is controlled by a starter relay 12 in response to a control signal from the controller 7.

Figure 7:
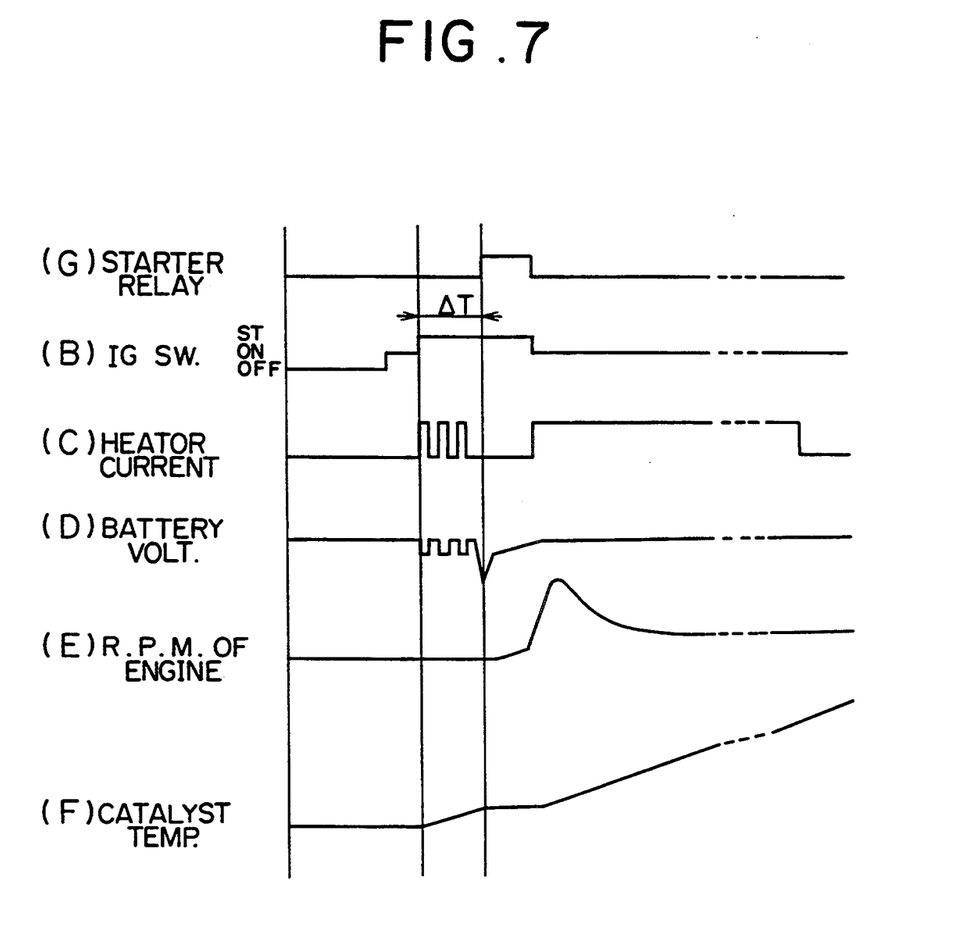
FIG. 7 is a timing chart showing various waveforms associated with the current supply to the heater for the catalyst according to this invention.

Next the operation of the embodiment is described by reference to FIGS. 6 and 7. Assume that the engine is first at rest and the driver of the automobile turns the ignition switch 8 from the OFF to the START position, as shown at waveform (B) in FIG. 7. Then, for a predetermined period $\Delta T$, the controller 7 turns on and off the heater current control switch 4 at a predetermined frequency, to supply a pulse-shaped current from the battery 9 to the resistance heater 2a. The pulse-repetition frequency and the duty factor (the ratio of the pulse width to the pulse spacing) is determined by the controller 7, such that the electrically heated catalyst 2 is heated gradually to an appropriate temperature. The pre-heating of the electrically heated catalyst 2 is effected in a brief interval, and, since a large current is supplied from the battery 9 to the resistance heater 2a, the voltage of the battery 9 fluctuates conspicuously as shown at (D) in FIG. 7. During this time $\Delta T$ as determined by the timer means 7a, the controller 7 keeps the starter relay 12 open, and the current is not supplied from the battery 9 to the engine starter 11. The automotive engine 1 is thus not started and the service of the various electrical devices is not yet needed.

When the preheating of the electrically heated catalyst 2 is completed after the delay time $\Delta T$, the controller 7 closes the starter relay 12 to supply current from the battery 9 to the engine starter 11. The automotive engine 1 is thus cranked by the engine starter 11 and started. Since the delay time ΔT is short, the reduction in the operational performance in starting the engine is not conspicuous.

When the starter relay 12 is closed to crank and start the automotive engine 1, the controller 7 turns off the heater current control switch 4 to interrupt the current supply from the battery 9 to the resistance heater 2a, as shown at (G), (C) and (E). When the engine is started and the starter relay 12 is opened, the controller 7 turns on the heater current control switch 4 continuously. Thus, a continuous current is supplied from the battery 9 to the resistance heater 2a to heat the electrically heated catalyst 2 completely. Under this circumstance, the current supplied to the resistance heater 2a is at a constant fixed level, and the voltage of the battery 9 is thus kept substantially at a constant level. Consequently, the generation of noise in the inputs to the various electrical devices supplied from the battery 9 can effectively be suppressed. As shown at waveforms (C) and (F), the electrically heated catalyst 2 is turned off when the temperature of the catalyst exceeds the level at which the best performance of the electrically heated catalyst 2 can be obtained.

What is claimed is:

1. A control device for controlling a current supply from a battery to an electrical heater for pre-heating a catalyst device for an automotive engine cranked by an electrical starter, said control device comprising:

heater current control switch means for turning on and off a current supply from said battery to said electrical heater;

catalyst temperature detector means for detecting a temperature of said catalyst device and generating an output signal indicating a detected temperature;

battery voltage detector means for detecting a voltage of said battery and generating an output signal indicating a detected voltage;

an ignition switch including at least an OFF contact, an ON contact, a START contact, and a HEAT contact, to any one of which a driver of an automobile may selectively turn a key switch, said ignition switch generating an output signal indicating a position of said key switch; and controller means coupled to said catalyst temperature detector means, said battery voltage detector means and said ignition switch, said controller means controlling said heater current control switch means in response to said output signals from said catalyst temperature detector means, said battery voltage detector means, and said ignition switch, wherein: (a) in response to said output signal from said ignition switch indicating that said key switch is turned to said HEAT contact, said controller means determines said battery voltage on the basis of said output of said battery voltage detector means and turns on said heater current control switch means to supply current from said battery to said electrical heater to commence a pre-heating of said catalyst device when said battery voltage exceeds a predetermined level; and (b) said controller means determines said catalyst temperature on the basis of said output of said catalyst temperature detector means, and returns said key switch to said START contact to supply current from said battery to said electrical starter and thereby to commence automatically a cranking of said automotive engine when said catalyst temperature exceeds a predetermined level.

2. A control device for controlling a current supply from a battery to an electrical heater for pre-heating a catalyst device for an automotive engine cranked by an electrical starter, said control device comprising:

heater current control switch means for turning on and off a current supply from said battery to said electrical heater;

catalyst temperature detector means for detecting a temperature of said catalyst device and generating an output signal indicating a detected temperature;

battery voltage detector means for detecting a voltage of said battery and generating an output signal indicating a detected voltage;

an ignition switch including at least an OFF contact, an ON contact, a START contact, and a HEAT contact, to any one of which a driver of an automobile may selectively turn a key switch, said ignition switch generating an output signal indicating a position of said key switch; and controller means coupled to said catalyst temperature detector means, said battery voltage detector means and said ignition switch, said controller means controlling said heater current control switch means in response to said output signals from said catalyst temperature detector means, said battery voltage detector means, and said ignition switch, wherein: (a) in response to said output signal from said ignition switch indicating that said key switch is turned to said HEAT contact, said controller means determines said battery voltage on the basis of said output of said battery voltage detector means and turns on said heater current control switch means to supply current from said battery to said electrical heater to commence a pre-heating of said catalyst device when said battery voltage exceeds a predetermined level; and (b) said controller means determines said catalyst temperature on the basis of said output of said catalyst temperature detector means, and returns said key switch to said ON contact when said catalyst temperature exceeds a predetermined level, wherein said controller means supplies current from said battery to said electrical starter to commence cranking of said automotive engine when said driver turns said key switch to said START contact.

3. A control device for controlling a current supply from a battery to an electrical heater for pre-heating a catalyst device for an automotive engine cranked by an electrical starter, said control device comprising:

heater current control switch means for turning on and off a current supply from said battery to said electrical heater;

catalyst temperature detector means for detecting a temperature of said catalyst device and generating an output signal indicating a detected temperature;

battery voltage detector means for detecting a voltage of said battery and generating an output signal indicating a detected voltage;

an ignition switch including at least an OFF contact, an ON contact, and a START contact to any one of which a driver of an automobile may selectively turn a key switch, said ignition switch generating a first output signal indicating a pre-heating operation when said key switch is turned to said START contact a first time after said key switch is turned from said OFF contact to said ON contact, and said ignition switch generating a second output signal indicating a cranking of said automotive engine when said key switch is turned to said START contact a second time; and controller means coupled to said catalyst temperature detector means, said battery voltage detector means and said ignition switch, said controller means controlling said heater current control switch means in response to said output signals from said catalyst temperature detector means, said battery voltage detector means, and said ignition switch, wherein: (a) in response to said output signal from said ignition switch indicating that said key switch is turned to said START contact a first time, said controller means determines said battery voltage on the basis of said output of said battery voltage detector means and turns on said heater current control switch means to supply current from said battery to said electrical heater to commence a pre-heating of said catalyst device when said battery voltage exceeds a predetermined level; and (b) said controller means determines said catalyst temperature on the basis of said output of said catalyst temperature detector means, and returns said key switch to said ON contact when said catalyst temperature exceeds a predetermined level, wherein said controller supplies current from said battery to said electrical starter to commence cranking of said automotive engine when said driver turns said key switch from said ON contact to said START contact.

4. A control device for controlling a current supply from a battery to an electrical heater for pre-heating a catalyst device for an automotive engine cranked by an electrical starter, said control device comprising:

an ignition switch including at least a START contact; and controller means, including timer means and coupled to said ignition switch, wherein:
(a) said controller means supplies a pulse-shaped current from said battery to said electrical heater for a predetermined interval of time determined by said timer means;
(b) after said predetermined interval of time, said controller supplies current from said battery to said starter to crank and start said automobile engine; and
(c) after said automobile engine is started, said controller supplies a continuous current substantially at a constant level from said battery to said electrical heater.

5. A control device as claimed in claim 4, wherein said controller interrupts current supply from said battery to said electrical heater after said predetermined interval of time.

6. A control device as claimed in claim 4, further comprising:

catalyst temperature detector means for detecting a temperature of said catalyst device, said catalyst temperature detector means outputting a signal indicating a detected temperature to said controller;

wherein said controller interrupts supply of said continuous current to said electrical heater upon receiving a signal from said catalyst temperature detector indicating that a temperature of said catalyst device has exceeded a predetermined level.

* * * * *